US012755563B2

(12) United States Patent
Shimizu et al.

(10) Patent No.: US 12,755,563 B2
(45) Date of Patent: Oct. 6, 2026

(54) DETERMINATION DEVICE, DETERMINATION METHOD, AND STORAGE MEDIUM

(71) Applicant: HONDA MOTOR CO., LTD., Tokyo (JP)

(72) Inventors: Takahiro Shimizu, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/017,832

(22) Filed: Jan. 13, 2025

(65) Prior Publication Data

US 2025/0239089 A1 Jul. 24, 2025

(30) Foreign Application Priority Data

Jan. 22, 2024 (JP) ................................ 2024-007393

(51) Int. Cl.
*G06F 16/29* (2019.01)
*G01C 21/34* (2006.01)
*G06V 20/56* (2022.01)

(52) U.S. Cl.
CPC .......... *G06V 20/588* (2022.01); *G01C 21/34* (2013.01); *G06F 16/29* (2019.01)

(58) Field of Classification Search
None
See application file for complete search history.

(56) References Cited

U.S. PATENT DOCUMENTS

2022/0388533 A1* 12/2022 Tamura ............ B60W 60/0059
2023/0339471 A1* 10/2023 Kleinschmidt ... B60W 60/0015

FOREIGN PATENT DOCUMENTS

JP 09-035198 2/1997
JP 2011-175572 9/2011
JP 2015-210729 11/2015
JP 2017-068617 4/2017
JP 2018-200501 12/2018
JP 2020-201210 12/2020

OTHER PUBLICATIONS

Japanese Office Action for Japanese Patent Application No. 2024-007393 mailed Oct. 14, 2025.

* cited by examiner

*Primary Examiner* — Eileen M Adams
(74) *Attorney, Agent, or Firm* — Amin, Turocy & Watson, LLP

(57) ABSTRACT

A determination device includes a storage medium that stores computer-readable instructions, and a processor connected to the storage medium, in which the processor executes the computer-readable instructions to recognize a road marking present in a moving direction of a vehicle, and determine whether the recognized road marking matches a map road marking based on map information stored in a storage unit, and when the vehicle approaches a curved road, the processor determines whether the recognized road marking matches the map road marking, with a restriction on a range of the recognized road marking to a range before a reference point taking into consideration a switching point to the curved road.

6 Claims, 6 Drawing Sheets

FIG. 3

| DRIVING MODE | CONTROL STATE | TASK |
|---|---|---|
| MODE A | AUTONOMOUS DRIVING | FRONT MONITORING: NOT REQUIRED<br>STEERING GRIPPING: NOT REQUIRED |
| MODE B | DRIVING ASSISTANCE | FRONT MONITORING: REQUIRED<br>STEERING GRIPPING: REQUIRED |
| MODE C | DRIVING ASSISTANCE | FRONT MONITORING: REQUIRED<br>STEERING GRIPPING: REQUIRED |
| MODE D | DRIVING ASSISTANCE | FRONT MONITORING: REQUIRED<br>AT LEAST DRIVING OPERATION OF CERTAIN DEGREE IS REQUIRED |
| MODE E | MANUAL DRIVING | FRONT MONITORING: REQUIRED<br>DRIVING OPERATION IS REQUIRED IN RELATION TO BOTH STEERING AND ACCELERATION/DECELERATION |

TASK: LIGHT

TASK: HEAVY

DETERMINATION DEVICE, DETERMINATION METHOD, AND STORAGE MEDIUM

BACKGROUND

Field of the Invention

The present invention relates to a determination device, a determination method, and a storage medium.

Description of Related Art

In recent years, efforts have been actively made to provide access to a sustainable transportation system with special attention to people in vulnerable situations among traffic participants. To implement this, research and development for further improving the safety or convenience of traffic through research and development regarding an autonomous driving technique has been focused on.

Incidentally, in the autonomous driving technique, while matching of a road marking recognized from a camera image and a road marking recognized from map information is confirmed and a result of confirmation is used to generate a target trajectory of a host vehicle, for example, there is a problem in that, when the host vehicle travels on a curved road or a branch road, misrecognition is likely to occur for the road marking recognized from the camera image. To solve this problem, Japanese Unexamined Patent Application, First Publication No. 2017-068617 discloses that image recognition on a branch side is limited in a case where the position of the host vehicle is in a section of a branch road. In addition, Japanese Unexamined Patent Application, First Publication No. 2018-200501 discloses that, in a case where the evaluation of continuity of an actual boundary and a map boundary obtained from a recognition range in front of and behind a host vehicle during traveling on a curved road is high, information regarding the actual boundary and the map boundary is integrated and used, and in a case where the evaluation is low, the map boundary is used.

However, the related art is to deal with misrecognition for a camera road marking in a case where the host vehicle travels on the branch road or the curved road, but not to deal with misrecognition at a timing before the host vehicle enters the curved road. As a result, at the timing before the host vehicle enters the curved road, misrecognition may occur for a camera road marking or a map road marking, and the target trajectory of the host vehicle may not be generated as appropriate.

SUMMARY

The present invention has been accomplished in consideration of such a situation, and one of objects of the present invention is to provide a determination device, a determination method, and a storage medium capable of appropriately dealing with the occurrence of misrecognition of a camera road marking at a timing before a host vehicle enters a curved road. The present invention, in turn, contributes to development of a sustainable transportation system.

A determination device according to the invention employs the following configuration.

(1) A determination device according to an aspect of the invention includes a storage medium that stores computer-readable instructions, and a processor connected to the storage medium, in which the processor executes the computer-readable instructions to recognize a road marking present in a moving direction of a vehicle, and determine whether the recognized road marking matches a map road marking based on map information stored in a storage unit, and when the vehicle approaches a curved road, the processor determines whether the recognized road marking matches the map road marking, with a restriction on a range of the recognized road marking to a range before a reference point taking into consideration a switching point to the curved road.

(2) In the aspect of (1) described above, in a case where the vehicle passes through the reference point, the processor releases the restriction and determines whether the recognized road marking matches the map road marking for the range of the recognized road marking.

(3) In the aspect of (1) described above, in a case where the vehicle passes through a prescribed position before the reference point, the processor releases the restriction and determines whether the recognized road marking matches the map road marking for the range of the recognized road marking.

(4) In the aspect of (1) described above, the processor sets the reference point as the switching point in a case where the vehicle is a prescribed distance away from the switching point, and sets the reference point as a point that is positioned in the moving direction with respect to the switching point and obtained from a vehicle speed of the vehicle, in a case where the vehicle is not the prescribed distance away from the switching point.

(5) A determination method according to another aspect of the present invention includes, by a computer mounted in a vehicle, recognizing a road marking present in a moving direction of the vehicle, determining whether the recognized road marking matches a map road marking based on map information stored in a storage unit, and when the vehicle approaches a curved road, determining whether the recognized road marking matches the map road marking, with a restriction on a range of the recognized road marking to a range before a reference point taking into consideration a switching point to the curved road.

(6) A storage medium according to still another aspect of the present invention stores a program for causing a computer mounted in a vehicle to recognize a road marking present in a moving direction of the vehicle, determine whether the recognized road marking matches a map road marking based on map information stored in a storage unit, and when the vehicle approaches a curved road, determine whether the recognized road marking matches the map road marking, with a restriction on a range of the recognized road marking to a range before a reference point taking into consideration a switching point to the curved road.

According to the aspects of (1) to (6) described above, it is possible to appropriately deal with the occurrence of misrecognition in the camera road marking or the map road marking at a timing at which the host vehicle enters the curved road.

BRIEF DESCRIPTION OF THE DRAWINGS

FIG. 3 is a diagram illustrating a correspondence relationship of a driving mode, a control state of a host vehicle, and a task.

DESCRIPTION OF EMBODIMENTS

Hereinafter, an embodiment of a determination device, a determination method, and a storage medium of the present invention will be described with reference to the drawings.

Overall Configuration

Figure 1:
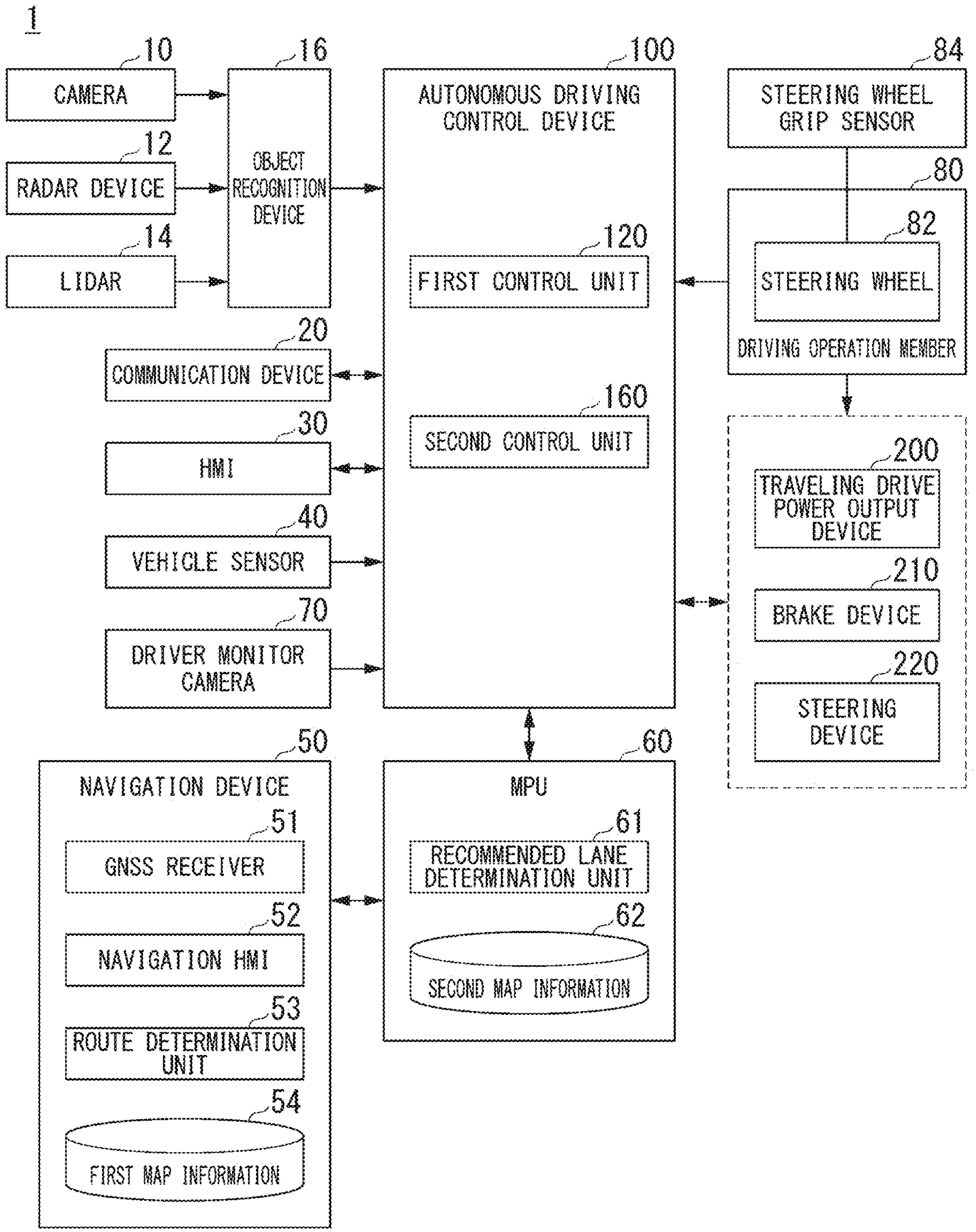
FIG. 1 is a configuration diagram of a vehicle system using a determination device according to an embodiment.

FIG. 1 is a configuration diagram of a vehicle system 1 using the determination device according to the embodiment. A vehicle in which the vehicle system 1 is mounted is, for example, a two-wheeled, three-wheeled, or four-wheeled vehicle, and a drive source thereof is an internal combustion engine such as a diesel engine or a gasoline engine, an electric motor, or a combination thereof. The electric motor operates using electric power generated by a generator coupled to the internal combustion engine or electric power discharged from a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operation member 80, an autonomous driving control device 100, a traveling drive power output device 200, a brake device 210, and a steering device 220. These devices and apparatuses are connected to each other by a multiplex communication line such as a controller area network (CAN) communication line, a serial communication line, or a wireless communication network. The configuration shown in FIG. 1 is merely an example, and a part of the configuration may be omitted or another configuration may be added.

The camera 10 is, for example, a digital camera using a solid-state imaging element such as a charge coupled device (CCD) or a complementary metal oxide semiconductor (CMOS). The camera 10 is attached at any place on a vehicle (hereinafter, referred to as a host vehicle M) in which the vehicle system 1 is mounted. In imaging the front, the camera 10 is attached to an upper portion of a front windshield, a back surface of a rear-view mirror, or the like. The camera 10 periodically and repeatedly images, for example, the surroundings of the host vehicle M. The camera 10 may be a stereo camera.

The radar device 12 radiates radio waves such as millimeter waves to the surroundings of the host vehicle M, and detects radio waves (reflected waves) reflected by an object to detect at least a position of (a distance to and a direction of) the object. The radar device 12 is attached at any place on the host vehicle M. The radar device 12 may detect a position and a speed of an object by a frequency modulated continuous wave (FM-CW) method.

The LIDAR 14 irradiates the surroundings of the host vehicle M with light (or electromagnetic waves with a wavelength close to that of light) and measures scattered light. The LIDAR 14 detects a distance to a target on the basis of a time from light emission to light reception. The irradiation light is, for example, pulsed laser light. The LIDAR 14 is attached at any place on the host vehicle M.

The object recognition device 16 executes sensor fusion processing on detection results of a part or all of the camera 10, the radar device 12, and the LIDAR 14 to recognize a position, a type, a speed, and the like of an object. The object recognition device 16 outputs a recognition result to the autonomous driving control device 100. The object recognition device 16 may output the detection results of the camera 10, the radar device 12, and the LIDAR 14 to the autonomous driving control device 100 without change. The object recognition device 16 may be omitted from the vehicle system 1.

The communication device 20 communicates with another vehicle in the surroundings of the host vehicle M using, for example, a cellular network, a Wi-Fi network, Bluetooth (Registered Trademark), or dedicated short range communication (DSRC) or communicates various server devices via a wireless base station.

The HMI 30 presents various kinds of information to an occupant of the host vehicle M, and receives an input operation by the occupant. The HMI 30 includes various display devices, a speaker, a buzzer, a touch panel, a switch, keys, and the like.

The vehicle sensor 40 includes a vehicle speed sensor that detects a speed of the host vehicle M, an acceleration sensor that detects an acceleration, a yaw rate sensor that detects an angular velocity around a vertical axis, an azimuth sensor that detects a direction of the host vehicle M, and the like.

The navigation device 50 includes, for example, a global navigation satellite system (GNSS) receiver 51, a navigation HMI 52, and a route determination unit 53. The navigation device 50 stores first map information 54 in a storage device such as a hard disk drive (HDD) or a flash memory. The GNSS receiver 51 specifies a position of the host vehicle M on the basis of signals received from GNSS satellites. The position of the host vehicle M may be specified or completed by an inertial navigation system (INS) using an output of the vehicle sensor 40. The navigation HMI 52 includes a display device, a speaker, a touch panel, keys, and the like. The navigation HMI 52 may be partially or entirely shared with the HMI 30 described above. The route determination unit 53 determines a route (hereinafter, referred to as an on-map route) from the position of the host vehicle M specified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, or the like. The on-map route is output to the MPU 60. The navigation device 50 may perform route guidance using the navigation HMI 52 on the basis of the on-map route. The navigation device 50 may be implemented by, for example, a function of a terminal device such as a smartphone or a tablet terminal owned by the occupant. The navigation device 50 may transmit a current position and a destination to a navigation server via the communication device 20 and may acquire a router equivalent to the on-map route from the navigation server.

The MPU 60 includes, for example, a recommended lane determination unit 61, and stores second map information 62 in a storage device such as an HDD or a flash memory. The recommended lane determination unit 61 divides the on-map route provided from the navigation device 50 into a plurality of blocks (for example, divides the on-map route by 100 [m]

in a vehicle moving direction), and determines a recommended lane for each block with reference to the second map information 62. The recommended lane determination unit 61 performs determination which lane from the left the vehicle travels on. When a branch point is present on the on-map route, the recommended lane determination unit 61 determines a recommended route such that the host vehicle M can travel along a reasonable route for advancing to a branch destination.

The second map information 62 is map information with higher accuracy than the first map information 54. The second map information 62 includes, for example, information on a center of a lane, information on a boundary of a lane, or the like. The second map information 62 may include road information, traffic regulation information, address information (address or zip code), facility information, telephone number information, information on a prohibited section where a mode A or a mode B described below is prohibited, or the like. The second map information 62 may be updated at any time by the communication device 20 communicating with another device.

The driver monitor camera 70 is, for example, a digital camera using a solid-state imaging element such as a CCD or a CMOS. The driver monitor camera 70 is attached at any place on the host vehicle M in a position and a direction in which the head of an occupant (hereinafter, referred to as a driver) seated in a driver's seat of the host vehicle M is able to be imaged from the front (in a direction in which the face is imaged). For example, the driver monitor camera 70 is attached to an upper portion of a display device provided in a center portion of an instrument panel of the host vehicle M.

The driving operation member 80 includes, for example, an accelerator pedal, a brake pedal, a shift lever, and other operation members, in addition to a steering wheel 82. A sensor that detects an operation amount or the presence or absence of an operation is attached to the driving operation member 80, and a detection result thereof is output to the autonomous driving control device 100 or a part or all of the traveling drive power output device 200, the brake device 210, and the steering device 220. The steering wheel 82 is an example of an "operation member that receives a steering operation by the driver." The operation member is not necessarily in an annular shape, and may be in a form of a deformed steering wheel, a joystick, a button, or the like. A steering wheel grip sensor 84 is attached to the steering wheel 82. The steering wheel grip sensor 84 is implemented by a static capacitance sensor or the like, and outputs, to the autonomous driving control device 100, a signal capable of detecting whether the driver is gripping the steering wheel 82 (meaning that the driver is in contact with the steering wheel 82 in a state of applying force to the steering wheel 82).

The autonomous driving control device 100 includes, for example, a first control unit 120 and a second control unit 160. Each of the first control unit 120 and the second control unit 160 is implemented by, for example, a hardware processor such as a central processing unit (CPU) executing a program (software). A part or all of these components may be implemented by software (circuit part, including circuitry) such as large scale integration (LSI), an application specific integrated circuit (ASIC), a field-programmable gate array (FPGA), a graphics processing unit (GPU), or a system on chip (SOC), or may be implemented by software and hardware in cooperation. The program may be stored in advance in a storage device (a storage device including a non-transitory storage medium) such as an HDD or a flash memory of the autonomous driving control device 100 or may be stored in a removable storage medium such as a DVD or a CD-ROM and may be installed on the HDD or the flash memory of the autonomous driving control device 100 when the storage medium (non-transitory storage medium) is loaded into a drive device. The autonomous driving control device 100 including a determination unit 132 described below is an example of a "determination device".

Figure 2:
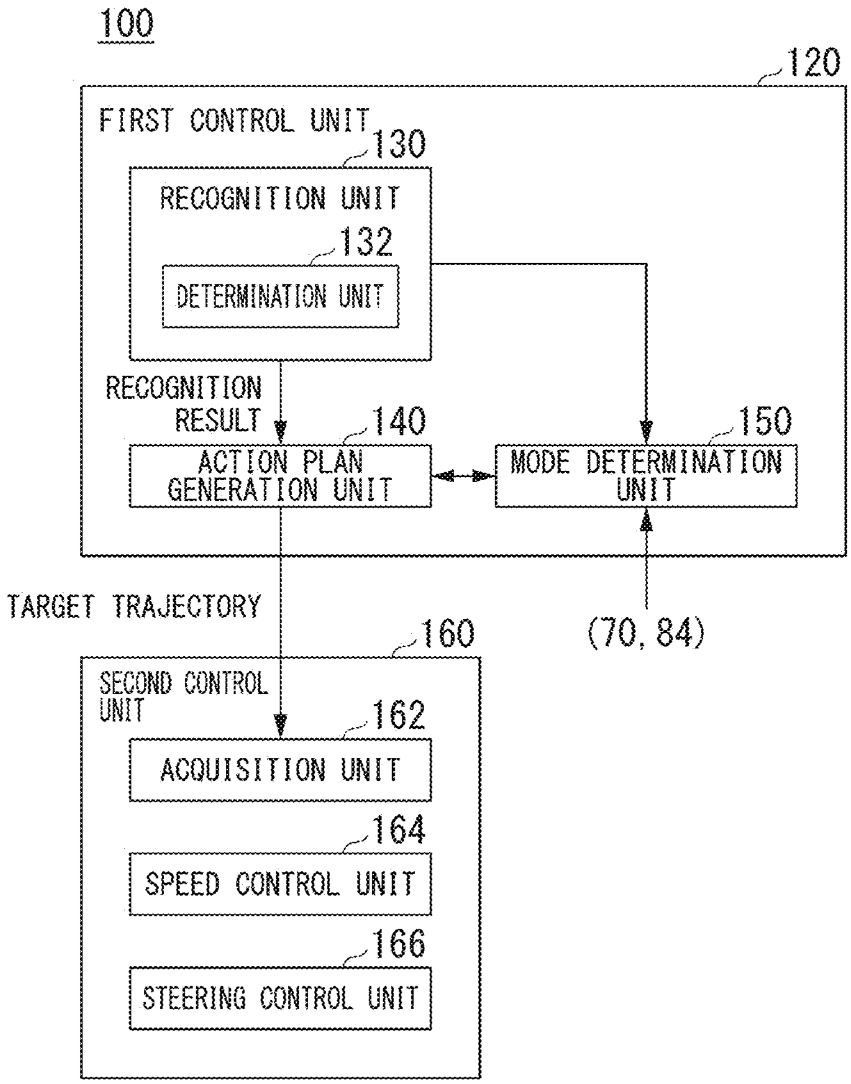
FIG. 2 is a functional configuration diagram of a first control unit and a second control unit.

FIG. 2 is a functional configuration diagram of the first control unit 120 and the second control unit 160. The first control unit 120 includes, for example, a recognition unit 130, a determination unit 132, an action plan generation unit 140, and a mode determination unit 150. The first control unit 120 simultaneously implements, for example, functions by artificial intelligence (AI) and functions by a model given in advance. For example, a function of "recognizing an intersection" may be implemented by simultaneously executing recognition of an intersection by deep learning or the like and recognition based on conditions given in advance (a signal, a road sign, and the like that can be used for pattern matching) and scoring both recognitions to comprehensively evaluating the recognitions. Accordingly, the reliability of autonomous driving is secured.

The recognition unit 130 recognizes a position and a state such as a speed or an acceleration of an object in the surroundings of the host vehicle M on the basis of information input from the camera 10, the radar device 12, and the LIDAR 14 via the object recognition device 16. A position of an object is recognized as, for example, a position on absolute coordinates with a representative point (a center of gravity, a drive axis center, or the like) of the host vehicle M as an origin and is used for control. The position of the object may be represented as a representative point such as a center of gravity or a corner of the object or may be represented as a region. A "state" of an object may include an acceleration or a jerk of an object or an "action state" of an object (for example, whether an object is changing a lane or is about to change a lane).

The recognition unit 130 recognizes, for example, a lane (traveling lane) on which the host vehicle M is traveling. For example, the recognition unit 130 recognizes a traveling lane by comparing a pattern (hereinafter, referred to as a "map road marking") of a road marking obtained from the second map information 62 with a pattern (hereinafter, referred to as a "camera road marking") of a road marking in the surroundings of the host vehicle M recognized from an image captured by the camera 10. More specifically, the determination unit 132 of the recognition unit 130 calculates a deviation between the map road marking and the camera road marking, and in a case where determination is made that the calculated deviation is equal to or less than a threshold (that is, in a case where determination that the map road marking matches the camera road marking), recognizes any one (or a center line) of the map road marking and the camera road marking as a traveling lane. Details of comparison processing of the camera road marking and the camera road marking by the determination unit 132 will be described below. The recognition unit 130 may recognize a traveling lane by recognizing a road boundary including a road marking, a road shoulder, a curbstone, a median strip, a guard rail, and the like, instead of a road marking. In the recognition, the position of the host vehicle M acquired from the navigation device 50 or a processing result by the INS may be taken into consideration. The recognition unit 130 recognizes a temporary stop line, an obstacle, a red signal, a toll gate, and other road events.

In recognizing a traveling lane, the recognition unit 130 recognizes a position or a posture of the host vehicle M with respect to the traveling lane. The recognition unit 130 may recognize a deviation of a reference point of the host vehicle M from the center of the lane and an angle with respect to a line in which the center of the lane in the moving direction of the host vehicle M is aligned, as a relative position and a posture of the host vehicle M with respect to the traveling lane. Alternatively, the recognition unit 130 may recognize a position or the like of the reference point of the host vehicle M with respect to any side end portion (road marking or road boundary) of the traveling lane as a relative position of the host vehicle M with respect to the traveling lane.

The action plan generation unit 140 basically travels on a recommended lane determined by the recommended lane determination unit 61, and generates a target trajectory along which the host vehicle M will autonomously travel (without depending on an operation of the driver) in the future to avoid an approach to an object (excluding an object such as a road marking, a road sign, or a manhole that the vehicle can climb over) recognized by the recognition unit 130. For example, the recognition unit 130 sets a risk region centered on an object of which the state is output, and in the risk region, a risk is set by the recognition unit 130 as an index value indicating a degree to which the host vehicle M is not to approach. The action plan generation unit 140 generates a target trajectory such that the host vehicle M does not pass through a point where the risk is equal to or greater than a prescribed value and travels in the recognized traveling lane. Since the object includes a moving object, the distribution of the risk is not one per control cycle, and is set for a plurality of future time points in consideration of a future position of the object predicted on the basis of a speed of the object. For example, the target trajectory is expressed by sequentially arranging points (trajectory points) that the host vehicle M will reach. The trajectory points are points that the host vehicle M will reach at each prescribed traveling distance (for example, about several [m]) in a road distance, and separately, a target speed and a target acceleration at each prescribed sampling time (for example, about several tenths of a [sec]) are generated as a part of the target trajectory. The trajectory points may be positions that the host vehicle M will reach within a prescribed sampling time at each sampling time. In this case, information on the target speed or the target acceleration is expressed by an interval of the trajectory points.

The action plan generation unit 140 may set an event of autonomous driving in generating the target trajectory. The event of autonomous driving includes a constant speed traveling event, a low speed following traveling event, a lane change event, a branching event, a merging event, a takeover event, and the like. The action plan generation unit 140 generates a target trajectory according to an activated event.

The mode determination unit 150 determines a driving mode of the host vehicle M to any of a plurality of driving modes in which tasks imposed on the driver are different. FIG. 3 is a diagram showing an example of a correspondence relationship of a driving mode, a control state of the host vehicle M, and a task. The driving mode of the host vehicle M is, for example, five modes of a mode A to a mode E. The control state, that is, a degree of automation of driving control of the host vehicle M is highest in the mode A, decreases in the order of the mode B, the mode C, and the mode D, and is lowest in the mode E. In contrast, the task impose on the driver is lightest in the mode A, gets heavier in the order of the mode B, the mode C, and the mode D, and is heaviest in the mode E. In the modes D and E, since the control state is not autonomous driving, the autonomous driving control device 100 is responsible for ending control related to autonomous driving and shifting to driving assistance or manual driving. Hereinafter, the contents of each driving mode will be illustrated.

In the mode A, the vehicle is in a state of autonomous driving, and neither front monitoring nor gripping (in the drawing, steering gripping) of the steering wheel 82 is imposed on the driver. However, even in the mode A, the driver is required to be in a posture capable of quickly shifting to manual driving in response to a request from a system centered on the autonomous driving control device 100. The autonomous driving as used herein means that both steering and acceleration/deceleration are controlled without depending on a driver's operation. The front means a space in the moving direction of the host vehicle M to be visually recognized via the front windshield. The mode A is, for example, a driving mode that can be executed in a case where a condition that the host vehicle M is traveling at a prescribed speed (for example, about 50 [km/h] or less) on an expressway such as a highway, and a following target preceding vehicle is present is satisfied, and may be called traffic jam pilot (TJP). In a case where the condition is not satisfied, the mode determination unit 150 changes the driving mode of the host vehicle M to the mode B.

In the mode B, the vehicle is in a state of driving assistance, and a task (hereinafter, referred to as front monitoring) of monitoring the front of the host vehicle M is imposed on the driver, but a task of gripping the steering wheel 82 is not imposed on the driver. In the mode C, the vehicle is in a state of driving assistance, and the task of front monitoring and the task of gripping the steering wheel 82 are impose on the driver. The mode D is a driving mode in which the driver is required to perform a driving operation of a certain degree in relation to at least one of steering and acceleration/deceleration of the host vehicle M. For example, in the mode D, driving assistance such as adaptive cruise control (ACC) or lane keeping assist system (LKAS) is performed. In the mode E, the vehicle is in a state of manual driving in which the driver is required to perform a driving operation in relation to both steering and acceleration/deceleration. In both the mode D and the mode E, the task of monitoring the front of the host vehicle M is of course imposed on the driver.

The driving mode is not limited to the modes illustrated in FIG. 3, and may be specified by other definitions. For example, in a driving mode in which both front monitoring and steering gripping are required, a threshold for determination that the steering wheel is gripped may be loose or severe. More specifically, while the driver may touch the steering wheel 82 with any of right and left hands in a certain driving mode, in another driving mode in which the task imposed on the driver is heavier, the driving mode may be defined such that the driver is required to grip the steering wheel 82 with both hands at a strength of the threshold or more. In addition, driving modes in which the heaviness of the task imposed on the driver is different may be defined in any way.

The autonomous driving control device 100 (and a driving assistance device (not shown)) executes automated lane change according to a driving mode. The automated lane change includes automated lane change (1) according to a system request and automated lane change (2) according to a driver request. The automated lane change (1) includes automated lane change that is provided for passing and is performed in a case where a speed of a preceding vehicle is slower than the speed of the host vehicle by a reference or the more, and automated lane change for moving toward a destination (automated lane change due to a change in recommended lane). The automated lane change (2) involves making the host vehicle M change the lane toward in an operation direction when a direction indicator is operated by the driver in a case where a condition regarding a speed or a positional relationship with a surrounding vehicle is satisfied.

The autonomous driving control device 100 does not execute either of the automated lane change (1) or (2) in the mode A. The autonomous driving control device 100 executes both the automated lane changes (1) and (2) in the modes B and C. The driving assistance device (not shown) does not execute the automated lane change (1) and executes the automated lane change (2) in the mode D. In the mode E, both the automated lane changes (1) and (2) are not executed.

The mode determination unit 150 changes the driving mode of the host vehicle M to a driving mode in which the task is heavier in a case where the task related to the determined driving mode (hereinafter, referred to as a current driving mode) is not executed by the driver.

For example, in a case where the driver is in a posture where the driver cannot shift to manual driving in response to a request from the system in the mode A (for example, in a case where the driver continues to look outside a permissible area or in a case where a sign that driving becomes difficult is detected), the mode determination unit 150 performs control for prompting the driver to shift to manual driving using the HMI 30. When the driver does not respond, the mode determination unit 150 performs control such that the host vehicle M is moved closer to a road shoulder and is gradually stopped, and autonomous driving is stopped. After the autonomous driving is stopped, the host vehicle is in the mode D or E, and the host vehicle M can be started by a manual operation of the driver. Hereinafter, the same applies to "stopping of autonomous driving". In a case where the driver is not monitoring the front in the mode B, the mode determination unit 150 performs control for prompting the driver to monitor the front using the HMI 30. When the driver does not respond, the mode determination unit 150 performs control such that the host vehicle M is moved closer to a road shoulder and is gradually stopped, and autonomous driving is stopped. In the mode C, in a case where the driver is not monitoring the front or in a case where the driver is not gripping the steering wheel 82, the mode determination unit 150 performs control for prompting the driver to monitor the front and/or to grip the steering wheel 82 using the HMI 30. When the driver does not respond, the mode determination unit 150 performs control such that the host vehicle M is moved closer to a road shoulder and is gradually stopped, and autonomous driving is stopped.

The mode determination unit 150 further monitors a state of the driver to perform the mode change and determines whether the state of the driver is a state according to the task. For example, the mode determination unit 150 analyzes an image captured by the driver monitor camera 70 to execute posture estimation processing and determines whether the driver is in a posture where the driver cannot shift to manual driving in response to a request from the system. The mode determination unit 150 analyzes an image captured by the driver monitor camera 70 to execute line-of-sight estimation processing and determines whether the driver is monitoring the front.

In the present embodiment, in a case where the determination unit 132 determines that the map road marking does not match the camera road marking, the mode determination unit 150 changes the driving mode of the host vehicle M to a driving mode in which the task is heavier. For example, in a case where determination is made that the map road marking does not match the camera road marking while the host vehicle M is traveling in a driving mode (the mode A or the mode B) in which steering gripping is not required, the mode determination unit 150 changes the driving mode to the mode D or the mode E.

The mode determination unit 150 further executes various kinds of processing for the mode change. For example, the mode determination unit 150 instructs the action plan generation unit 140 to generate a target trajectory for stopping at a road shoulder, instructs the driving assistance device (not shown) to operate, or controls the HMI 30 to prompt the driver to perform an action.

The second control unit 160 controls the traveling drive power output device 200, the brake device 210, and the steering device 220 such that the host vehicle M passes the target trajectory generated by the action plan generation unit 140 at a scheduled time.

Returning to FIG. 2, the second control unit 160 includes, for example, an acquisition unit 162, a speed control unit 164, and a steering control unit 166. The acquisition unit 162 acquires information on the target trajectory (trajectory points) generated by the action plan generation unit 140 and stores the acquired information in a memory (not shown). The speed control unit 164 controls the traveling drive power output device 200 or the brake device 210 on the basis of a speed element associated with the target trajectory stored in the memory. The steering control unit 166 controls the steering device 220 according to a degree of curving of the target trajectory stored in the memory. The processing of the speed control unit 164 and the steering control unit 166 is implemented by, for example, a combination of feedforward control and feedback control. As an example, the steering control unit 166 executes feedforward control according to a curvature of a road in front of the host vehicle M and feedback control based on a deviation from the target trajectory in combination.

The traveling drive power output device 200 outputs traveling drive power (torque) for a vehicle to travel to drive wheels. The traveling drive power output device 200 includes, for example, a combination of an internal combustion engine, an electric motor, a transmission, and the like, and an electronic control unit (ECU) that controls the internal combustion engine, the electric motor, the transmission, and the like. The ECU controls the above-described configuration according to information input from the second control unit 160 or information input from the driving operation member 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second control unit 160 or information input from the driving operation member 80 such that brake torque according to a braking operation is output to each wheel. The brake device 210 may include, as a backup, a mechanism that transmits hydraulic pressure generated by an operation of a brake pedal included in the driving operation member 80 to the cylinder via a master cylinder. The brake device 210 is not limited to the configuration described above, and may be an electronically controlled hydraulic brake device that controls an actuator according to information input from the second control unit 160 to transmit hydraulic pressure of the master cylinder to the cylinder.

The steering device 220 includes, for example, a steering ECU and an electric motor. The electric motor applies force to a rack-and-pinion mechanism to change a direction of turning wheels. The steering ECU drives the electric motor according to information input from the second control unit 160 or information input from the driving operation member 80 and changes the direction of the turning wheels.

Processing when Entering Curved Road

As described above, the determination unit 132 determines whether the map road marking obtained from the second map information 62 matches the camera road marking recognized from the camera image, and in a case where determination is made that the map road marking matches the camera road marking, the action plan generation unit 140 generates the target trajectory of the host vehicle M such that the host vehicle M travels on the traveling lane along the map road marking or the camera road marking. However, for example, when the host vehicle M travels on a curved road (more generally, a travel road in which a change in curvature of a marking is equal to or greater than a threshold), misrecognition is likely to occur in the camera road marking present far in the moving direction of the host vehicle M, and determination may be made that the map road marking does not match the camera road marking. As a result, actually, the misrecognition is corrected over time, even in a case where a change of a driving mode is not required, the mode determination unit 150 changes the driving mode of the host vehicle M to a driving mode in which the task is heavier, and the convenience for the driver may be impaired.

With this background, in a case where determination is made on the basis of second map information 62 that a curved road is present in a moving direction of the host vehicle M, the determination unit 132 determines whether the recognized camera road marking matches the map road marking, with a restriction on a range of the camera road marking recognized by the recognition unit 130 to a range before a reference point taking into consideration of a switching point to the curved road. Here, the determination unit 132 may determine that the curved road is present in the moving direction of the host vehicle M, on the basis of registered information indicating the curved road stored in the second map information 62 or may calculate a curvature of a travel road in the moving direction from travel road information stored in the second map information 62, and in a case where the calculated curvature is equal to or greater than a threshold, may determine that the curved road is present. Hereinafter, details of determination processing by the determination unit 132 will be described with reference to FIGS. 4 and 5.

Figure 4:
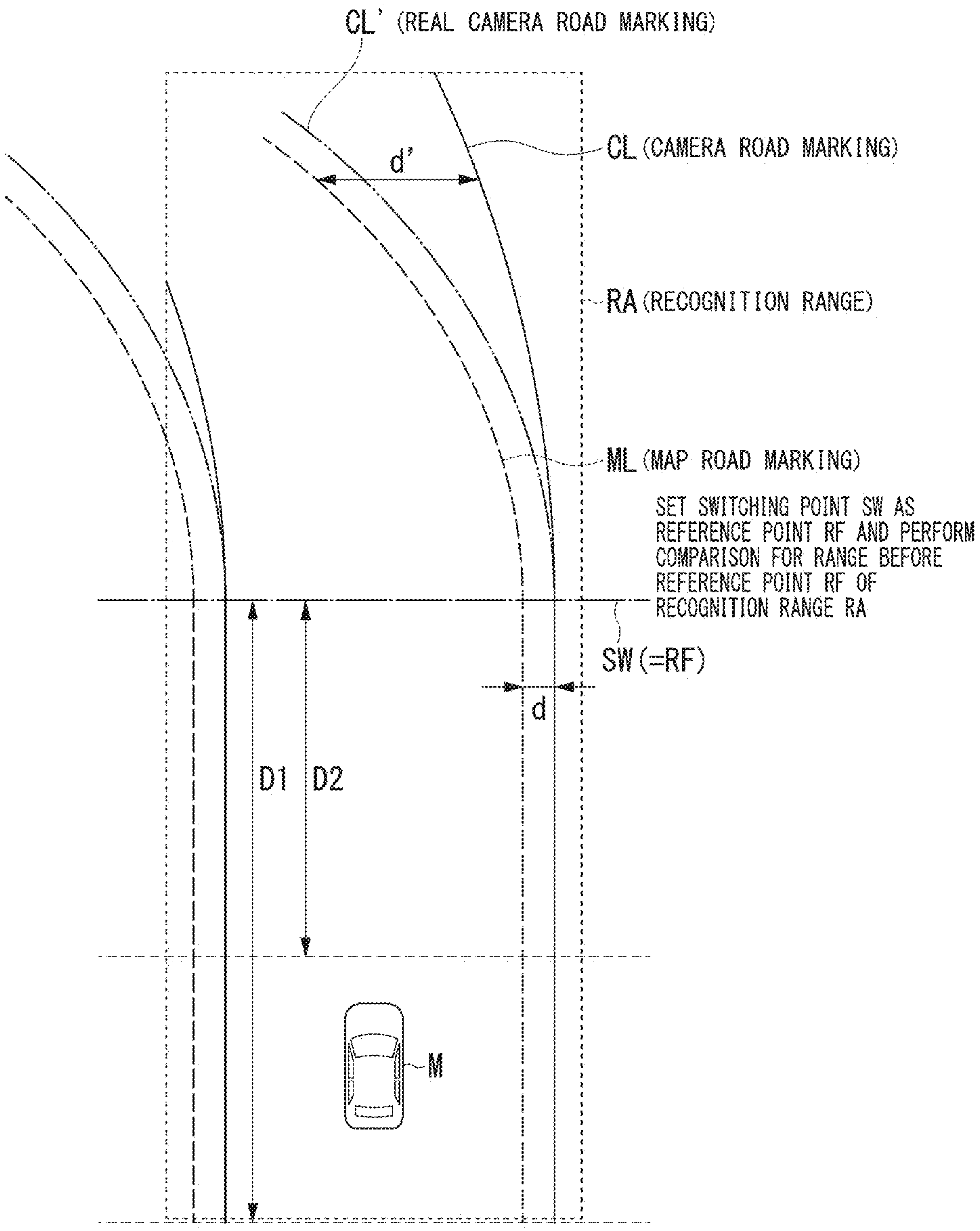
FIG. 4 is a diagram illustrating an example of a scene of determination processing that is executed by a determination unit.

FIG. 4 is a diagram showing an example of a scene of determination processing that is executed by the determination unit 132. In FIG. 4, a symbol CL represents a camera road marking, including a misrecognized portion, recognized by the recognition unit 130, a symbol CL' represents a real camera road marking with respect to the misrecognized portion, a symbol ML represents a map road marking, a symbol RA represents a recognition range of the camera road marking CL recognized by the recognition unit 130, a symbol SW represents a switching point from a straight road to a curved road recognized by the recognition unit 130, a symbol d represents a distance between a correctly recognized portion in the camera road marking CL and the map road marking ML, and a symbol d' represents a distance between a misrecognized portion of the camera road marking CL and the map road marking ML. The recognition unit 130 may specify the switching point SW from the straight road to the curved road on the basis of a change in curvature of the recognized camera road marking or may determine the switching point from the straight road to the curved road on the basis of a change in curvature of the map road marking stored in the second map information.

First, in a case where determination is made on the basis of the second map information 62 that a curved road is present in the moving direction of the host vehicle M, the determination unit 132 determines whether the host vehicle M is present at a position within a first distance D1 and with a second distance D2 or more from the switching point SW. In a case where determination is made that the host vehicle M is present at a position with the first distance D1 or more from the switching point SW, the determination unit 132 determines whether the camera road marking CL matches the map road marking ML for the whole recognition range RA. Here, the first distance D1 means a distance at which the host vehicle M is sufficiently away from a point where camera misrecognition is likely to occur, and accordingly, it is assumed that there will be no problem even when comparison processing of the road markings is executed for the whole recognition range RA. For example, the determination unit 132 may extract one or more comparison target points from the camera road marking CL and the map road marking ML in the recognition range RA, and in a case where a distance between the points is equal or less than a threshold, may determine that the camera road marking CL matches the map road marking ML. In the present embodiment, a matching determination method of the camera road marking CL and the map road marking ML may be any method, and for example, a total value or a maximum value of distances between a plurality of extracted points may be used.

On the other hand, in a case where the determination unit 132 determines that the host vehicle M is present at a position within the first distance D1 and with the second distance D2 or more from the switching point SW, this means that there is a risk of comparing the misrecognized camera road marking CL and the map road marking ML in a case where the comparison processing of the road markings is executed for the whole recognition range RA. For this reason, as shown in FIG. 4, the determination unit 132 sets the switching point SW as a reference point RF and determines whether the camera road marking CL matches the map road marking ML for a range before the reference point RF in the recognition range RA. With this, in FIG. 4, the distance d' between the misrecognized portion of the camera road marking CL and the map road marking ML is not used for comparison processing, and the distance d in the range before the reference point RF is used for comparison processing. With this, it is possible to prevent determination that the camera road marking CL does not match the map road marking ML and lowering of the level of the driving mode due to misrecognition of the camera road marking CL in a distant range of the host vehicle M.

Figure 5:
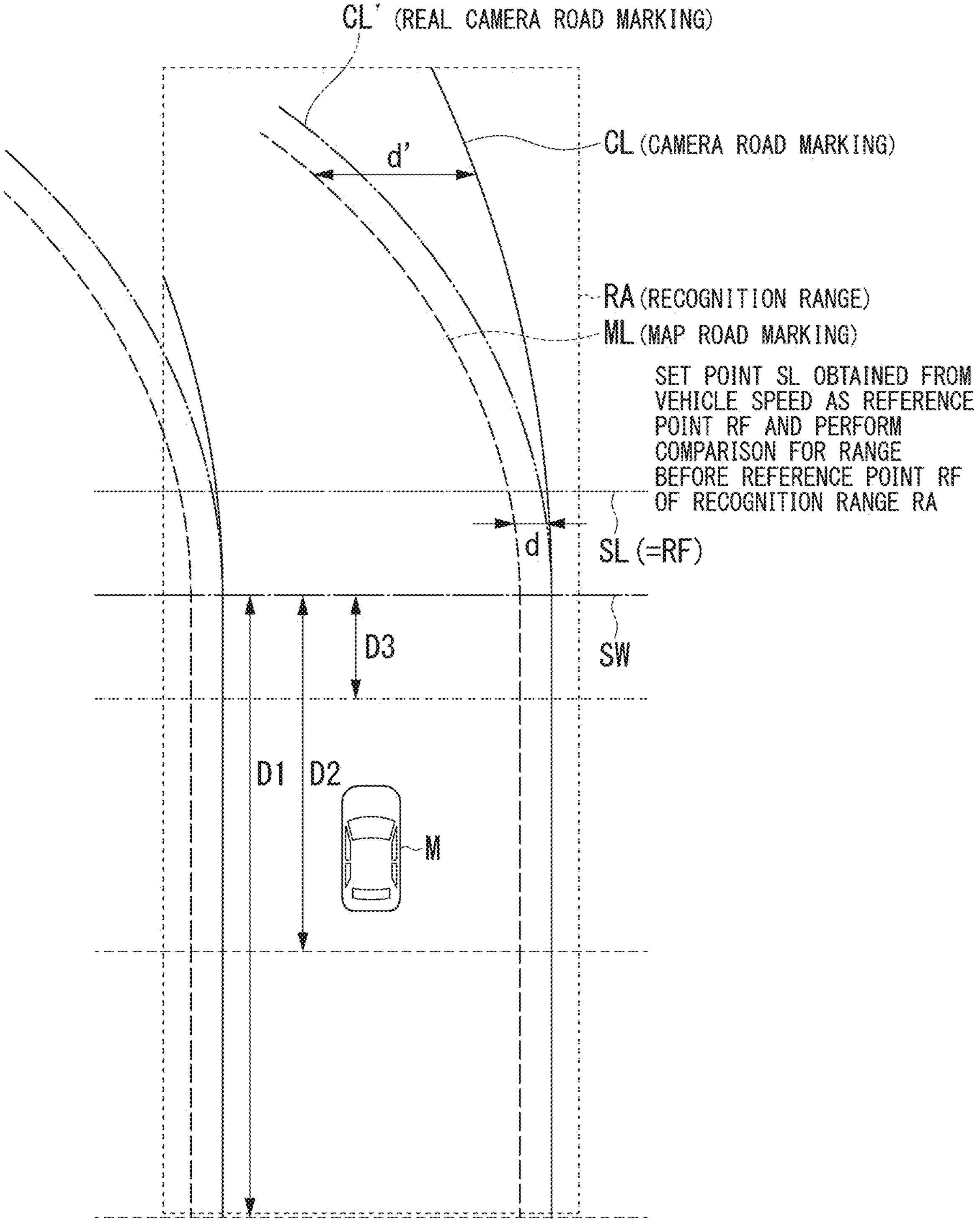
FIG. 5 is a diagram illustrating another example of a scene of determination processing that is executed by the determination unit.

FIG. 5 is a diagram showing another example of a scene of determination processing that is executed by the determination unit 132. FIG. 5 shows, as an example, a scene where the determination unit 132 determines that the host vehicle M is present at a position within the second distance D2 from the switching point SW. Here, the second distance D2 means a distance at which there is a risk of comparing the misrecognized camera road marking CL and the map road marking ML in a case where the comparison processing of the road markings is executed for the whole recognition range RA, and points that can be used for comparison processing are not present (or insufficient) only in a range of the host vehicle M and the switching point SW.

In a case where determination is made that the host vehicle M is present at the position within the second distance D2 from the switching point SW, as shown in FIG. 5, the determination unit 132 sets a point SL obtained from the vehicle speed of the host vehicle M as the reference point RF and determines whether the camera road marking CL matches the map road marking ML for a range before the reference point RF in the recognition range RA. More specifically, for example, the determination unit 132 sets the point SL corresponding to a distance about several times a speed per second of the host vehicle M from the host vehicle M as the reference point RF, and performs determination. With this, similarly to FIG. 4, it is possible to prevent the use of the distance d' between the misrecognized portion of the camera road marking CL and the map road marking ML for comparison processing, and to prevent lowering of the level of the driving mode.

As another aspect, instead of determining whether the host vehicle M is present at the position within the second distance D2 from the switching point SW, the determination unit 132 may set, as the reference point RF, a point corresponding to a longer distance out of a distance between the host vehicle M and the switching point SW and a distance between the host vehicle M and the point SL corresponding to the distance several times the speed per second of the host vehicle M. With this, when the host vehicle M approaches the switching point SW, the switching point SW is switched to the point SL at a certain time, and the point SL is used as the reference point RF for comparison processing.

Thereafter, when the host vehicle M passes through the switching point SW, the determination unit 132 executes the comparison processing of the road markings for the whole recognition range RA. This is because misrecognition of the camera road marking CL before the switching point SW tends to be corrected over time as described above. In other words, the camera road marking CL that is used for comparison processing after the host vehicle M passes through the switching point SW is less likely to be misrecognized, and in a case where the camera road marking CL does not match the map road marking ML, it is assumed that the camera road marking CL does not really match the map road marking ML. In a case where determination is made that the camera road marking CL does not match the map road marking ML, the mode determination unit 150 changes the driving mode of the host vehicle M to a driving mode in which the task is heavier. Alternatively, the mode determination unit 150 may not change the driving mode, and the action plan generation unit 140 may generate a target trajectory while giving priority to the map road marking ML over the camera road marking CL.

Alternatively, in a case where the host vehicle M passes through a prescribed position before passing through the switching point SW, the determination unit 132 may execute the comparison processing of the road markings for the whole recognition range RA. This means that, for example, in FIG. 5, in a case where determination is made that the host vehicle M is present at a position within a third distance D3 (where D3<D2) from the switching point SW, the determination unit 132 executes the comparison processing of the road markings for the whole recognition range RA.

In the above-described embodiment, the scene where the host vehicle M enters the curved road from the straight road has been described as an example. It should be noted that the present invention is not limited to such a configuration, and can also be applied to a scene where the host vehicle M enters a straight road from a curved road (a scene where the host vehicle M moves out of the curved road). In this case, the determination unit 132 specifies a switching point SW on the basis of, for example, a change in curvature from the curved road to the straight road, sets a reference point RF on the basis of whether the host vehicle M is present at a position within the first distance D1 and with the second distance D2 or more from the switching point SW or whether the host vehicle is present at a position within the second distance D2, and determines whether the camera road marking CL matches the map road marking ML for a range before the reference point RF in the recognition range RA. As a further application, the present invention can also be applied to, for example, a scene where the host vehicle M travels on an S-shaped curve. That is, the determination unit 132 executes the above-described determination processing multiple times when the host vehicle M enters the S-shaped curve, when the host vehicle M travels at a turnaround point, and when the host vehicle M exits from the S-shaped curve.

Processing Flow

Figure 6:
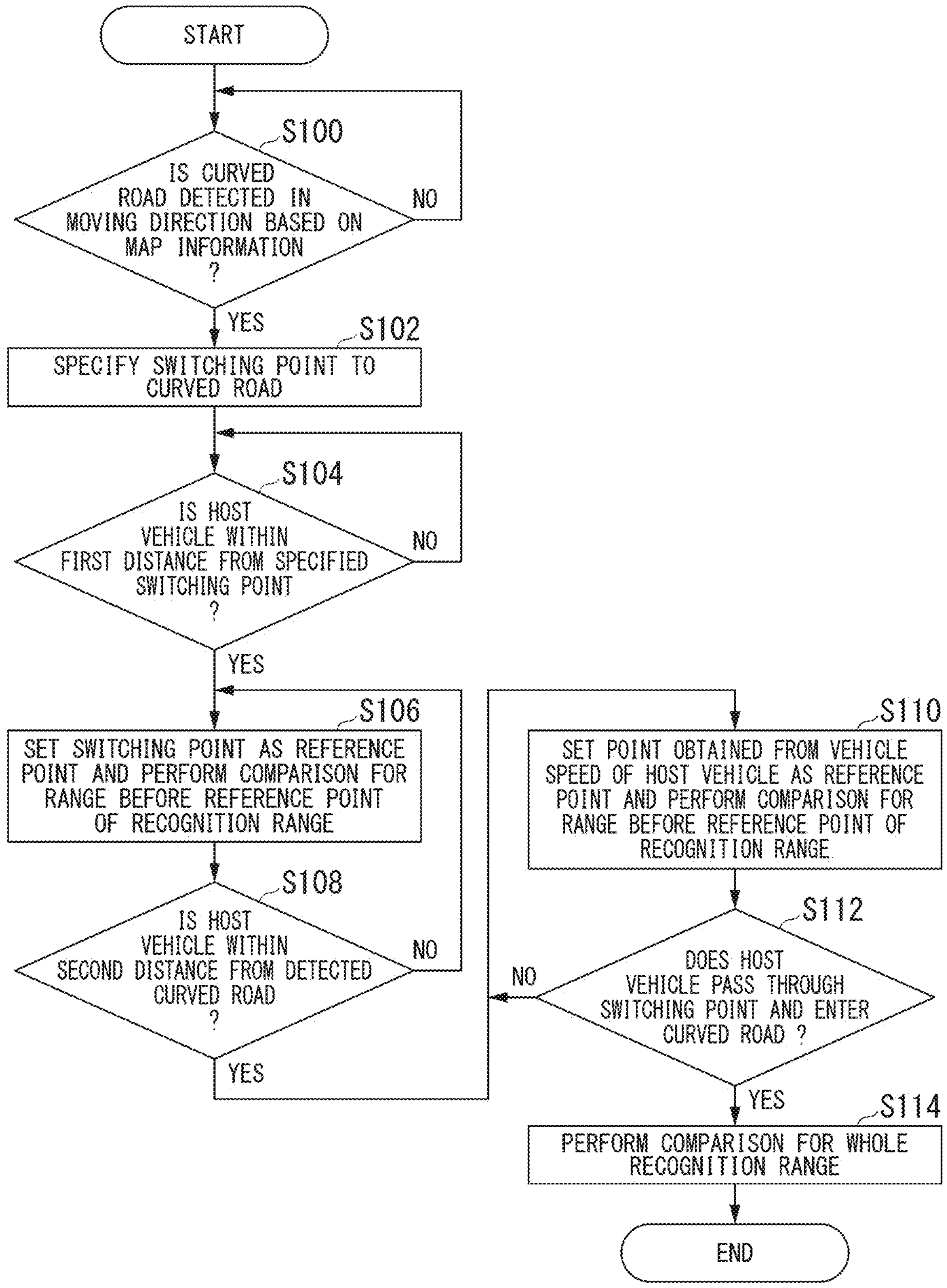
FIG. 6 is a flowchart illustrating an example of a flow of processing that is executed by the determination unit.

Next, a flow of processing that is executed by the determination unit 132 will be described with reference to FIG. 6. FIG. 6 is a flowchart illustrating an example of a flow of processing that is executed by the determination unit 132. The processing illustrated in the flowchart of FIG. 6 is repeatedly executed by the determination unit 132 when the host vehicle M is in a state of autonomous driving or is traveling in a driving mode in which driving assistance is executed.

First, the determination unit 132 determines whether the presence of a curved road in the moving direction of the host vehicle M is detected on the basis of the second map information 62 (Step S100). In a case where determination is made that the presence of a curved road in the moving direction of the host vehicle M is not detected, the determination unit 132 executes the processing of Step S100 again after a given time elapses. On the other hand, in a case where determination is made that the presence of a curved road in the moving direction of the host vehicle M is detected, next, the determination unit 132 specifies a switching point to the curved road (Step S102).

Next, the determination unit 132 determines whether the host vehicle M is present at a position within a first distance from the specified switching point (Step S104). In a case where determination is made that the host vehicle M is not present at the position within the first distance from the specified switching point, the determination unit 132 executes the processing of Step S104 again after a given time elapses. On the other hand, in a case where determination is made that the host vehicle M is present at the position within the first distance from the specified switching point, the determination unit 132 sets the switching point as a reference point, and compares a camera road marking and a map road marking for a range before the reference point in a recognition range (Step S106).

Next, the determination unit 132 determines whether the host vehicle M is present at a position within a second distance from the specified switching point (Step S108). In a case where determination is made that the host vehicle M is not present at the position within the second distance from the specified switching point, the determination unit 132 executes the processing of Step S108 again after a given time elapses. On the other hand, in a case where determination is made that the host vehicle M is present at the position within the second distance from the specified switching point, the determination unit 132 sets a point obtained from the vehicle speed of the host vehicle M as a reference point, and compares a camera road marking and a map road marking for a range before the reference point in the recognition range (Step S110).

Next, the determination unit 132 determines whether the host vehicle M passes through the switching point and enters the curved road (Step S112). In a case where determination is made that the host vehicle M does not pass through the switching point and does not enter the curved road, the determination unit 132 returns the process to Step S110. On the other hand, in a case where determination is made that the host vehicle M passes through the switching point and enters the curved road, the determination unit 132 compares a camera road marking and a map road marking for the whole recognition range (Step S114). With this, the determination processing by the determination unit 132 ends.

According to the present embodiment described above, when the vehicle approaches the curved road, the determination unit determines whether the recognized road marking matches the map road marking, with a restriction on the range of the road marking recognized by the recognition unit to a range before the reference point taking into consideration the switching point to the curved road. With this, it is possible to appropriately deal with the occurrence of misrecognition in the camera road marking or the map road marking at a timing at which the host vehicle enters the curved road.

The above-described embodiment can be expressed as follows.

A determination device including
- a storage device that stores a program, and
- a hardware processor,
- in which the hardware processor is configured to, by executing the program,
- recognize a road marking present in a moving direction of a vehicle,
- determine whether the recognized road marking matches a map road marking based on map information stored in a storage unit, and
- when the vehicle approaches a curved road, determine whether the recognized road marking matches the map road marking, with a restriction on a range of the recognized road marking to a range before a reference point taking into consideration a switching point to the curved road.

While a mode for carrying out the present invention has been described using the embodiment, the present invention is not limited to such an embodiment, and various modifications and replacements can be made without departing from the spirit of the present invention.

What is claimed is:

1. A determination device comprising:
- a storage medium that stores computer-readable instructions; and
- a processor connected to the storage medium,
- wherein the processor executes the computer-readable instructions to
  - recognize a road marking present in a moving direction of a vehicle, and
  - determine whether the recognized road marking matches a map road marking based on map information stored in a storage unit, and
- when the vehicle approaches a curved road, the processor determines whether the recognized road marking matches the map road marking, with a restriction on a range of the recognized road marking to a range before a reference point that is determined taking into consideration a switching point to the curved road, and excludes a range beyond the reference point from a target of the determination even when the processor recognizes a road marking in the range beyond the reference point.

2. The determination device according to claim 1,
- wherein, in a case where the vehicle passes through the reference point, the processor determines whether the recognized road marking matches the map road marking for a whole range of the recognized road marking.

3. The determination device according to claim 1,
- wherein, in a case where the vehicle passes through a prescribed position before the reference point, the processor and determines whether the recognized road marking matches the map road marking for a whole range of the recognized road marking.

4. A determination device comprising:
- a storage medium that stores computer-readable instructions; and
- a processor connected to the storage medium,
- wherein the processor executes the computer-readable instructions to
  - recognize a road marking present in a moving direction of a vehicle, and
  - determine whether the recognized road marking matches a map road marking based on map information stored in a storage unit, and
- when the vehicle approaches a curved road, the processor determines whether the recognized road marking matches the map road marking, with a restriction on a range of the recognized road marking to a range before a reference point that is determined taking into consideration a switching point to the curved road,
- wherein the processor sets the reference point as the switching point if the vehicle is a prescribed distance away from the switching point, or sets the reference point as a point that is positioned in the moving direction with respect to the switching point and obtained from a vehicle speed of the vehicle, if the vehicle is not the prescribed distance away from the switching point.

5. A determination method comprising:
- by a computer mounted in a vehicle,
- recognizing a road marking present in a moving direction of the vehicle;
- determining whether the recognized road marking matches a map road marking based on map information stored in a storage unit; and
- when the vehicle approaches a curved road, determining whether the recognized road marking matches the map road marking, with a restriction on a range of the recognized road marking to a range before a reference point that is determined taking into consideration a switching point to the curved road, and excludes a range beyond the reference point from a target of the determination even when the computer recognizes a road marking in the range beyond the reference point.

6. A computer-readable non-transitory storage medium storing a program for causing a computer mounted in a vehicle to:
- recognize a road marking present in a moving direction of the vehicle;
- determine whether the recognized road marking matches a map road marking based on map information stored in a storage unit; and
- when the vehicle approaches a curved road, determine whether the recognized road marking matches the map road marking, with a restriction on a range of the recognized road marking to a range before a reference point that is determined taking into consideration a switching point to the curved road, and excludes a range beyond the reference point from a target of the determination even when the computer recognizes a road marking in the range beyond the reference point.

* * * * *